Aug. 6, 1968  H. BÜRGER ETAL  3,395,492
TOOL GRINDING MACHINE WITH WET GRINDING DEVICE
Filed March 31, 1965  6 Sheets-Sheet 1

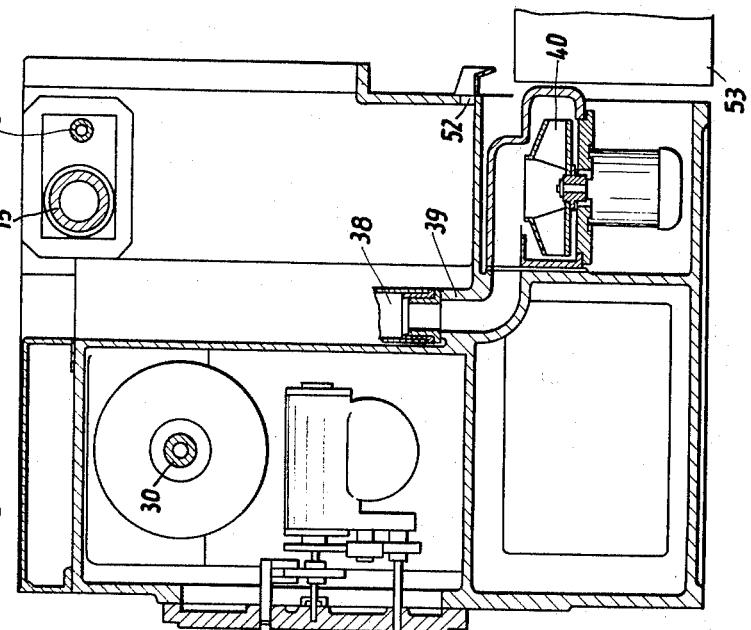
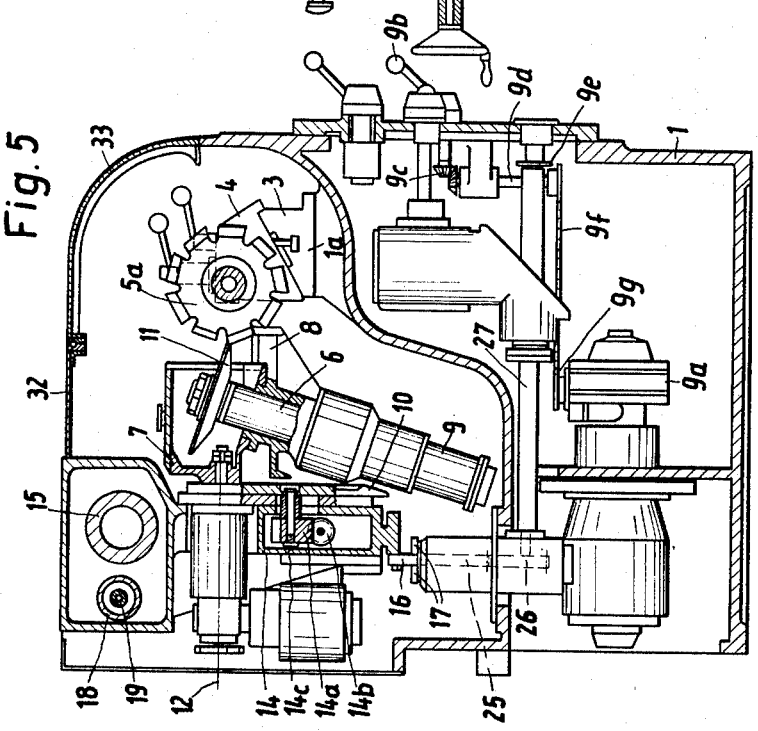

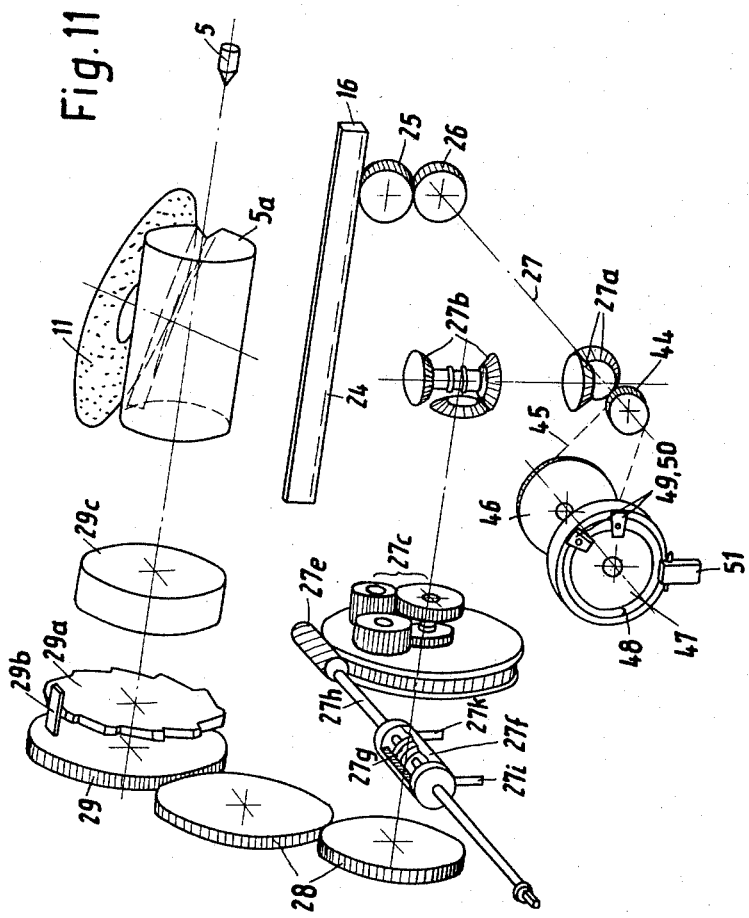

United States Patent Office 3,395,492
Patented Aug. 6, 1968

3,395,492
TOOL GRINDING MACHINE WITH WET GRINDING DEVICE
Hermann Bürger, Huckeswagen, Rhineland, Germany, assignor to W. Ferd. Klingelnberg Söhne, Remscheid-Berghausen, Germany
Filed Mar. 31, 1965, Ser. No. 444,191
Claims priority, application Italy, Apr. 2, 1964, 7,102/64
1 Claim. (Cl. 51—50)

ABSTRACT OF THE DISCLOSURE

Grinding machine having a frame with a working space in the frame in which space is a cylindrical guide member which supports a grinding carriage while a rail in the frame engages the carriage and prevents it from tilting on the guide member and with a transparent cover removeably mounted on the opening of the working chamber.

---

The present invention relates to a tool grinding machine with a wet grinding device. Tool grinding machines, in most instances, work as dry grinding machines. This is possible and economical as long as only small chip removals are required. If, however, it is necessary, due to a greater wear of the tools to be ground, to grind off thicker layers from the tool, the danger of considerable heat generation and consequently the formation of soft portions on the ground tool, limits the full use of the power of the machine. This drawback can be avoided by intensive cooling by a sufficiently and correspondingly dimensioned quantity of cooling fluid to be conveyed to the portions to be cooled. In this way the output of the grinding machine for rough machining can be taken advantage of in a much better way. In addition thereto, as is well known in connection with round and flat grinding, it is also possible with materials of the tools to obtain a considerably better surface by wet grinding, at least in most instances. It is for this reason that heretofore known tool grinding machines have been equipped with wet grinding devices which, however, have not proved quite satisfactory, particularly in view of a faulty protection of the guiding means for the machine and in view of the fact that the surroundings of the machine are not properly protected against grinding chips. Moreover, the spray water containing the ground-off particles is annoying.

The solution to the above-mentioned problem, viz, to create as effective a protection as possible against spraying cooling means is more difficult with a tool grinding machine of the most customary design in which the work piece supported by a reciprocatory carriage is moved past a stationary grinding disc than is the case, for instance, with round grinding machines. This is due to the form of the work pieces to be ground which, for instance with hobs, frequently has a rather serrated contour favoring the spraying around of the cooling fluid. In addition thereto, the cooling fluid jet is frequently subjected to such a high speed that when hitting the grinding disc, it washes off all of the chips and the loose grinding wheel particles thereon.

It is, therefore, an object of the present invention to provide a tool grinding machine with wet grinding means, which will overcome the above-mentioned drawbacks.

It is also an object of this invention to provide a tool grinding machine as set forth in the preceding paragraph which will permit a complete encasing of the working chamber toward the outside.

Still another object of this invention consists in the provision of a tool wet grinding machine as outlined above, in which the guiding means for a carriage carrying the grinding wheel will be protected against grinding dust and the cooling water.

Figure 1:
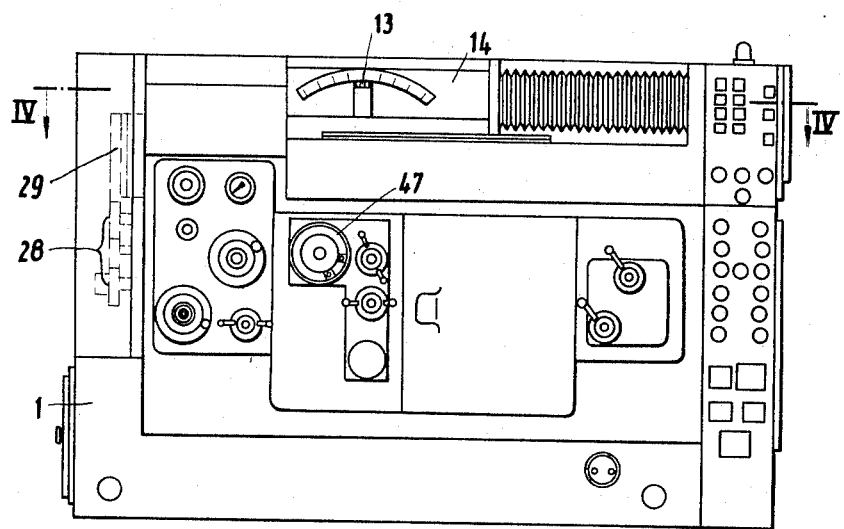
Figure 2:
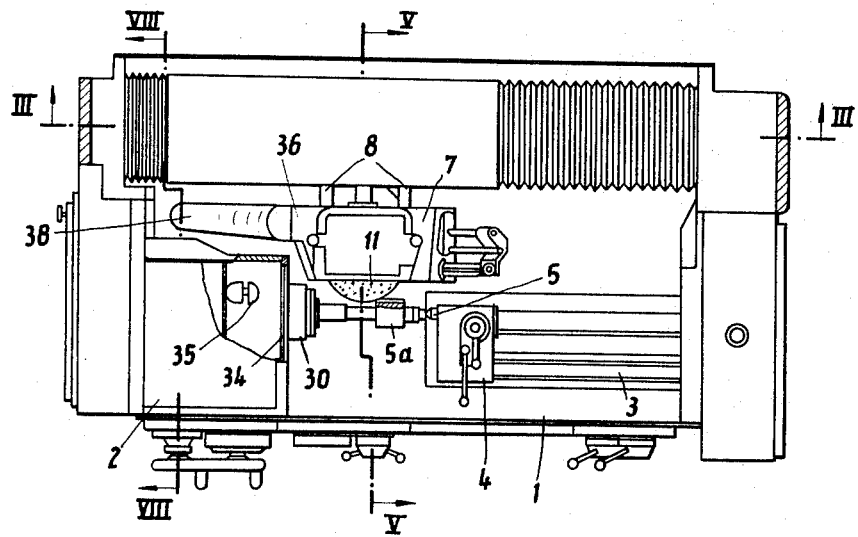
Figure 3:
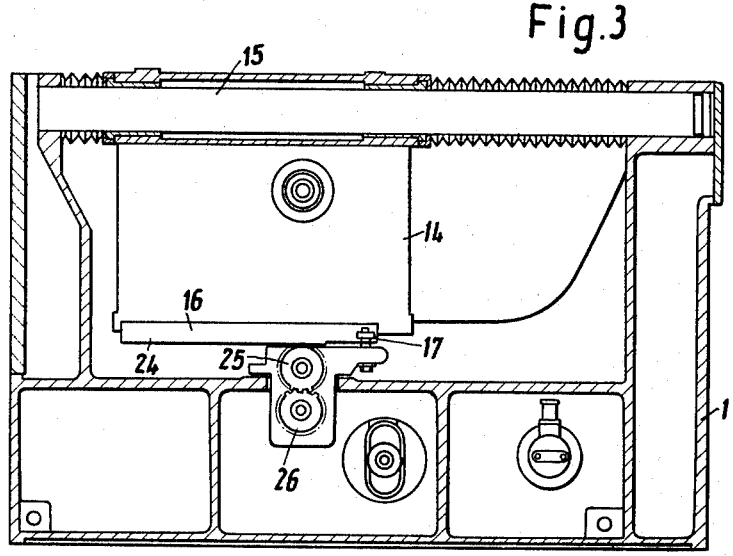
Figure 9:
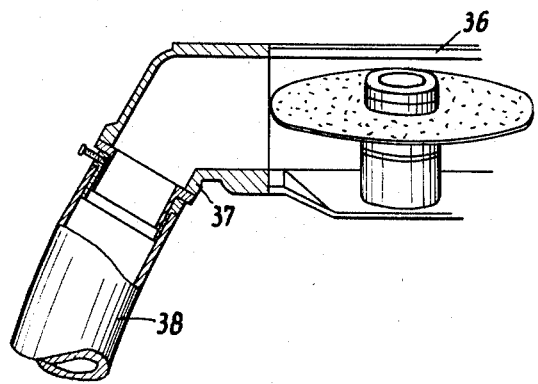
Figure 10:
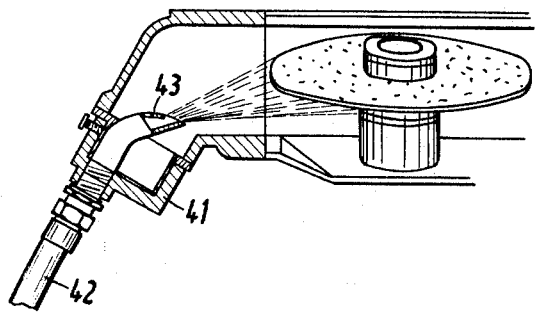
Figure 4:
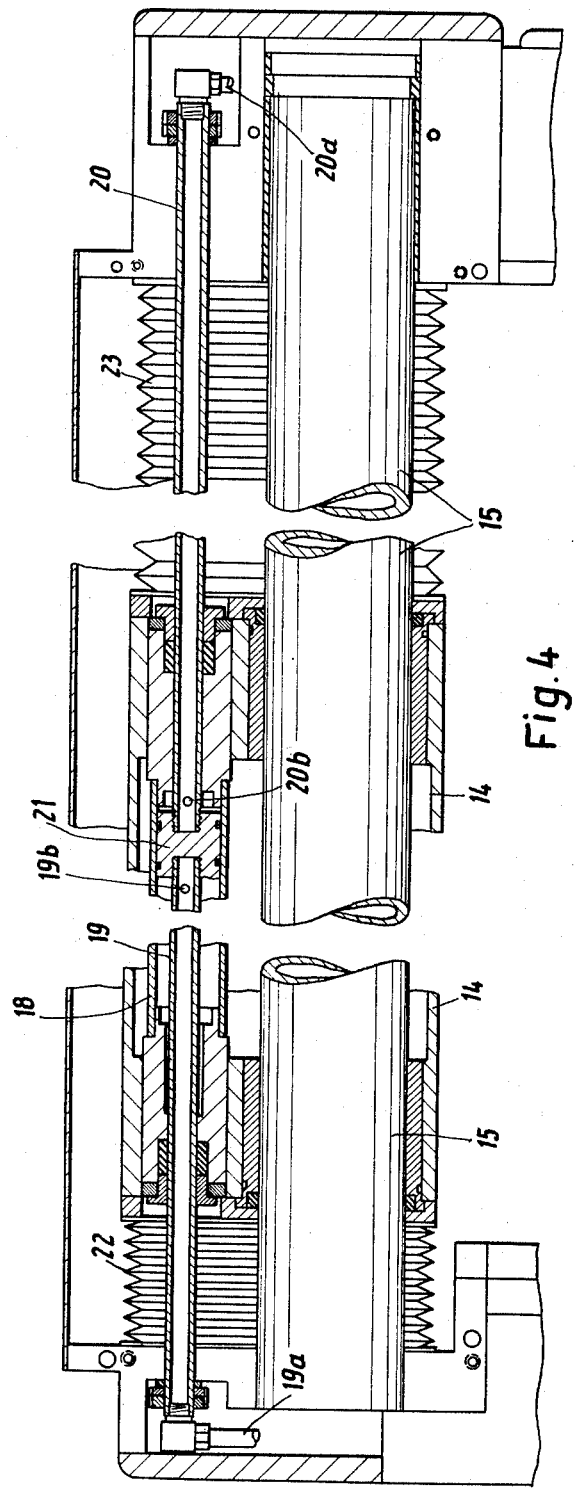
Figure 6:
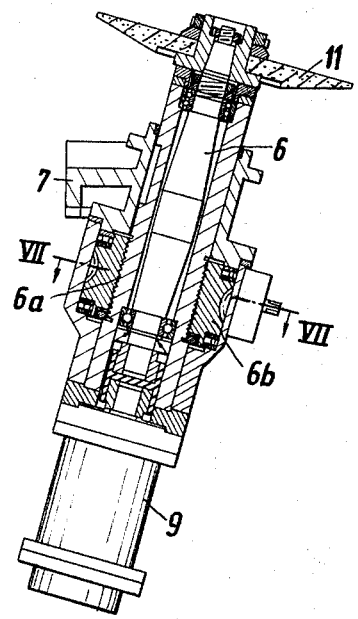
Figure 7:
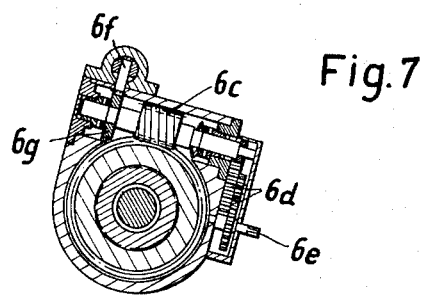

These and other objects and advantages of the invention will appear more clearly from the following specification in connection with the accompanying drawings, in which:

FIGURE 1 is a front view of a grinding machine according to the present invention;
FIGURE 2 is a top view of the grinding machine according to FIGURE 1;
FIGURE 3 is a section taken along the line III—III of FIGURE 2;
FIGURE 4 is a section along the line IV—IV of FIGURE 1;
FIGURE 5 represents a cross-section taken along line V—V of FIGURE 2;
FIGURE 6 is a longitudinal section through the bearing means for the grinding spindle;
FIGURE 7 is a cross-section through FIGURE 6 taken along the line VII—VII thereof;
FIGURE 8 represents a cross-section through FIGURE 2 taken along the line VIII—VIII thereof;
FIGURE 9 is a partial section through the protective cap of the grinding disc with a hose connected thereto for dust withdrawal;
FIGURE 10 is a section similar to that of FIGURE 9 but with a cooling water nozzle connected thereto; and
FIGURE 11 diagrammatically illustrates the gear train from the carriage carrying the grinding wheel to the work piece spindle.

The tool grinding machine according to the present invention which, while not limited to, is primarily intended for grinding cylindrical cutters with straight or helical sharp grinding grooves, receives the tool to be ground stationarily on the spindle so that in addition to the pitch movement, it has merely to carry out the helical movement necessary during the grinding, whereas the grinding spindle with the grinding disc mounted on the grinding carriage carries out the respective longitudinal stroke. The grinding machine according to the present invention is characterized in that the guiding means for the longitudinal movement of the grinding carriage is formed by a cylinder which, when looking from the operating side of the machine, extends above and behind the work piece axis parallel to the latter from the left to the right-hand side wall of the machine bed within the closed working chamber, while the carriage is secured against turning on said cylinder by a rail fastened to the lower end of said cylinder and guided between rollers on the machine bed. This design makes it possible to completely encase the entire guiding cylinder by bellows connected at both sides of the end walls of the machine bed and to the grinding carriage itself. Furthermore, the entire working chamber of the machine, including the grinding carriage and the guiding means therefor, may likewise be completely encased and closed toward the outside, so that even if the cooling medium is supplied under high pressure, it cannot be sprayed toward the outside.

Referring now to the drawings in detail, FIG. 1 shows a front view of the machine according to the invention with the operating control and indicating elements for adjusting the working cycle, and also shows the electric control board on the right-hand side of the machine. FIGS. 2 to 6 clearly show the arrangement of the guiding means for the grinding carriage and also show the fully enclosed working chamber. The machine bed 1 is box-shaped with a plurality of subdivisions and comprises a head stop 2 with which the bed forms a single piece.

Bed 1 has an elevated portion 1a (FIG. 5) on which is mounted a guiding body 3 of approximately triangular cross-section. Mounted on the top side of said guiding body 3 is a tail stock 4 with tail spindle and centers 5 (FIG. 2), said tail stock being adjustable and arrestable.

As will be seen from FIG. 5, grinding spindle 6 is journalled in a grinding head 7 while its axis forms with the vertical an angle of approximately 15°. Grinding head 7 is adjustable on two cylindrical guiding bars 8 behind the work piece and transverse to the work piece axis when looking from the operator side of the machine. The guiding bars 8 of grinding head 7 are fastened in a bearing bracket or bearing plate 10. For purposes of turning the grinding head 7 with the flat conical grinding disc 11 to the pitch angle of the chip grooves of the tool to be ground, said bearing bracket 10 is adapted to be turned about a horizontal axis 12 and to be arrested hydraulically in its working position. This turning movement is effected by a small electric motor and a worm wheel drive. The respective angular position of the grinding disc can be read on a scale 13. Grinding spindle 6 is adjustable in axial direction in grinding head 7 for the respective depth of the chip to be removed. This adjustment is effected by means best seen in FIGS. 6 and 7. The grinding spindle is arranged in a bearing sleeve which is guided in the housing of spindle head 7 and is provided with a thread 6a meshing with a worm wheel 6b forming a nut. A worm 6c meshing with worm wheel 6b may be driven either by a manually operable crank engaging a square head 6e, through gears 6d, or it may be driven through the intervention of a hydraulically operable pawl 6f which engages a ratchet wheel 6g on the worm shaft. Grinding spindle 6 is driven directly by an oil motor 9 which is infinitely variable as to speed and adapted to be drivingly connected to the lower end of spindle 6. The speed of oil motor 9 is determined by the adjustment of the delivery volume of a variable oil pump 9a delivering the oil for the oil motor. This adjustment is effected by a handle 9b (FIG. 5), bevel gears 9c, a shaft 9d, sprocket wheel 9e, chain 9f, sprocket wheel 9g and the adjusting shaft of pump 9a. Similarly, the oil to be delivered to a cylinder 18 (FIG. 3), which will be described later, is delivered by a second pump (not shown).

As will also be seen from FIG. 5, the bearing bracket or plate 10 with the guiding means 8 for the grinding head 7 is connected to a carriage 14 which is adapted to carry out a reciprocatory movement parallel to the axis of the work piece. Carriage 14, which henceforth may be designated grinding carriage, slides on a ground guiding cylinder 15 which is journalled behind and above the work piece spindle in the upwardly extended left-hand and right-hand walls of bed 1. Sliding carriage 14 is secured against rotation about the axis of guiding cylinder 15 by means of a rail 16 screwed to the lower end of grinding carriage 14. Rail 16 extends between two rollers 17 which are journalled on a support screwed onto bed 1. FIG. 5 also shows the work piece 5a and a tiltable segment 14a which is provided with worm wheel teeth meshing with a worm 14b. Said segment 14a is connected by means of a bolt 14c to the tiltable bearing bracket or plate 10. The motor driving worm 14b is not shown in FIG. 5.

Grinding carriage 14 is adapted to be reciprocated by an oil operable cylinder 18 at an infinitely variable speed. Oil cylinder 18 (FIG. 3) is displaceable on a hollow piston rod which is composed of two parts 19 and 20 and which are interconnected by a piston 21. The two piston rod sections 19 and 20 are screwed into the elevated left-hand and right-hand side walls of bed 1. The cylinder chambers on the right-hand side and left-hand side of piston 21 are alternately connected with the pressure side and suction side of the hydraulic system through said hollow piston rods 19 and 20 and through oil conduits 19a and 20a and the openings 19b and 20b.

Guiding cylinder 15 and piston rods 19 and 20 are, at the two ends protruding from the grinding carriage 14, fully protected against grinding dust and spray water by means of bellows 22 and 23 which are connected to grinding carriage 14 and the bed walls.

Rail 16 has its bottom side provided with teeth 24. A gear 25 meshing with these teeth is rotated in response to carriage 14 carrying out a stroke movement, so that gear 25 (FIG. 11) through the intervention of a further gear 26 drives a transmission shaft 27 arranged below the enclosed working chamber and extending transversely through the machine bed. Transmission shaft 27 drives through bevel gears 27a and a reversing gear 27b, a differential 27c with a play compensating device including cylinder 27f with a piston 27g. The said gear train drives change gears 28 (FIG. 1) and gear 29 keyed to work piece spindle 30. It will be appreciated that oil under pressure passed through conduits 27i and 27k will alternately act upon one or the other side of piston 27g with each change in the direction of movement of carriage 14, so that said piston, through the intervention of worm 27e mounted on shaft 27h forming the piston rod, will cause all gears in the gear train to engage each other without play in the new direction of movement.

Change gears 28 are adapted to adjust the transmission ratio which depends on the pitch of the grooves of the work piece so that work piece spindle 30 will carry out the turning movement necessary for the relative helical movement of the reciprocatory grinding disc 11 in the grooves of the work piece. The pitch control from groove to groove is effected by means of an index disc 29a in cooperation with an index pawl 29b and a hydraulic indexing motor 29c.

For the sake of completeness, FIG. 11 also shows a sprocket wheel 44 mounted on shaft 27 and driving a second sprocket 46 through the intervention of a chain 45. Fixedly connected to the shaft which carries sprocket wheel 46 and arranged at the front side of the machine is a disc 47 with an annular groove 48 in which blocks 49 and 50 may be adjusted and arrested by clamping. These blocks act upon a limit switch 51 which controls a magnetic valve of standard design which controls the oil supply to the two cylinder chambers of cylinder 18 and thereby reverses the driving direction of the grinding carriage 14 at the respective stroke end determined by the position of the abutment blocks 49, 50.

The working chamber of the machine within which grinding disc 14 moves is, as is evident from FIGS. 3, 5 and 8 closed at all sides toward the outside, and more specifically, toward the right and the left by the upwardly extending side walls of the bed, at the rear by a screwed-on protective wall 31, at the top by a cover 32 and the upper side of the grinding carriage as well as the adjacent bellows, whereas at the front, at the operator's side, there is provided a transparent hood 33 which can selectively be folded upwardly. In order to permit a better observation of the grinding operation, a lamp 35 (FIG. 2) is provided in a chamber in the work piece spindle head, which chamber is closed with regard to the working chamber by a transparent window 34.

Protective hood 36 (FIGS. 9 and 10) for grinding disc 11 has a withdrawal connection 37 to which may be connected either a hose 38 leading to a suction connection 39 of a suction vent 40 mounted on the rear side in the machine bed, or to which through the intervention of an exchangeable intermediate member 41 there may be connected a feeding line 42 with nozzle 43 for the cooling fluid. The reservoirs for the cooling fluid with the circulating pump and filters are arranged separately from the machine mounted on the rear side thereof and not shown in the drawing. The cooling fluid collecting at the bottom of the working chamber returns through an opening 52 at the back side of the bed into the reservoir 53.

It is, of course, to be understood that the present invention is, by no means, limited to the particular arrangement described above, but also comprises any modifications within the scope of the appended claim.

What is claimed is:

1. In a grinding machine for grinding tools, especially cylindrical cutters having longitudinal grooves therein, a frame, spindle means in the frame for supporting a cutter to be ground against axial movement while permitting indexing and rotary movement thereof, a grinding disc for grinding cutters along the grooves thereof, a grinding carriage supporting said grinding disc, an elongated cylindrical guiding member fixed in said frame in spaced parallel relation to said spindle means and supporting said carriage for longitudinal movement during a grinding operation, a rail secured to said carriage in spaced parallel relation to said cylindrical guiding member, and rollers stationarily mounted in said frame and guidingly engaging said rail on opposite sides thereof to secure said carriage against rotation on said cylindrical guiding member, said frame defining a working chamber having an access opening therein at the front of the frame and in which chamber said guiding means, said carriage, said spindle means, said rail and said rollers are located, said cylindrical guiding member being positioned at a higher level than said spindle means and being spaced backwardly toward the rear of the frame in the working chamber from the spindle means, said carriage being suspended beneath said cylindrical guiding member, said rail being connected to said carriage in the region of the lower end thereof, said frame including spaced end walls at opposite ends of said working chamber and in which said walls the ends of said cylindrical guiding member are fixedly mounted, flexible bellows means surrounding said cylindrical guiding member on opposite sides of said carriage having one end sealingly connected to the adjacent side of the carriage and the other end sealingly connected to the adjacent end wall whereby said cylindrical guiding member is fully enclosed and protected against grinding dust and cooling fluid, and transparent closure means for said access opening moveably mounted on the frame of the machine and moveable from chamber closing position into position to expose the chamber for access to the parts therein.

References Cited

UNITED STATES PATENTS

| | | | |
|---|---|---|---|
| 2,142,669 | 1/1939 | Carpenter | 51—34.2 X |
| 2,454,513 | 11/1948 | Honey | 51—272 |
| 2,477,915 | 8/1948 | Wilhide | 51—272 |
| 3,131,517 | 5/1964 | Townsend | 51—48 X |
| 3,146,551 | 9/1964 | Carlsen | 51—34.2 |
| 3,152,426 | 10/1964 | Arneson | 51—267 |
| 3,218,760 | 11/1965 | Thompson | 51—50 |
| 3,256,647 | 6/1966 | Hutton | 51—267 |

JAMES L. JONES, Jr., *Primary Examiner.*